Patented Aug. 29, 1944

2,356,820

UNITED STATES PATENT OFFICE 2,356,820

PREPARATION OF HYPOCHLORITES

George H. Cady, Wadsworth, Ohio, assignor to Pittsburgh Plate Glass Company, Allegheny County, Pa., a corporation of Pennsylvania No Drawing. Application August 10, 1938, Serial No. 224,169

1 Claim. (Cl. 23—86)

This invention relates to the production of lithium hypochlorite. Prior to this invention, it has been observed that chlorination of lithium compounds, such as lithium hydroxide, in order to secure a composition containing active chlorine results in the formation of a mixture of lithium hypochlorite containing substantial amounts of lithium chloride. Since lithium compounds are relatively expensive and since lithium chloride does not contain active chlorine, it is readily apparent that formation of lithium chloride is very undesirable and preferably should be minimized in order to obtain a product of high available chlorine content in good yield without undue expense.

In accordance with my invention, I have found that lithium compounds such as lithium hydroxide may be chlorinated in the presence of sodium or potassium hydroxide without production of such large amounts of lithium chloride. In addition, I have found that products of high active chlorine content may be produced by chlorination of other lithium compounds, such as lithium chloride, mixtures of lithium chloride and lithium hypochlorite, mixtures of lithium hydroxide and lithium chloride, etc., in the presence of sodium or potassium hydroxide.

The compounds may be chlorinated dry, as a paste or in solution or as a slurry in water or an inert liquid diluent, such as carbon tetrachloride. Upon chlorination, sodium or potassium chloride is produced and the major portion of this material may be removed if required, by crystallization. If desired, the lithium hydroxide may be chlorinated for a time before addition of sodium hydroxide to form a composition comprising lithium hypochlorite and lithium chloride and/or lithium hydroxide. Sodium hydroxide may then be added to this composition and chlorination may be continued until a product having the available chlorine content required is obtained.

Similarly, lithium chloride and sodium hydroxide may be chlorinated to form lithium hypochlorite, or a solution of sodium or potassium hypochlorite may be formed and lithium chloride or other lithium compounds, such as lithium nitrate added thereto, the lithium hypochlorite forming by double decomposition.

The lithium hypochlorite produced in this manner contains compounds of sodium or potassium, such as sodium or potassium chloride or hydroxide. If desired, a substantial portion of these compounds, particularly the chlorides, may be removed, for example, by evaporation of a solution of the hypochlorite and crystallization of the chlorides. This is not regarded as essential however since the hypochlorite composition may be used as such. In some cases, the maintenance of a substantial amount (several percent by weight) of sodium or potassium hydroxide, hypochlorite or other compound of these metals is desirable since this appears to have a stabilizing influence upon the lithium hypochlorite.

The lithium hypochlorite obtained in accordance with this invention may be dehydrated, if desired, in a suitable manner. If the hypochlorite is made in solution, it may be evaporated under vacuum without substantial loss of active chlorine. During this evaporation, a large percentage of the sodium or potassium chloride present precipitates and may be removed from solution. The product obtained may contain upward of 65 percent active chlorine and is very stable.

The amount of sodium hydroxide to be used may be varied in accordance with the amount of available chlorine desired in the final product. In general, sodium hydroxide in concentrations at least chemically equivalent to the lithium compound concentration is used although smaller concentrations of sodium hydroxide may be used if substantially complete elimination of lithium chloride is not regarded as necessary.

The following examples illustrate the invention:

Example I 68.4 parts by weight of chlorine was absorbed in a cold mixture containing 40 parts of sodium hydroxide, 23.9 parts by weight of lithium hydroxide and 220 parts of water. The solution was evaporated under vacuum until a crop of crystals of sodium chloride developed. These crystals were removed by filtration and the solution was further evaporated to develop further quantities of crystals. After removal of several crops of sodium chloride crystals, the solution was evaporated to dryness having a solid containing 77 percent active chlorine.

Example II 42 parts by weight of lithium chloride and 80 parts by weight of sodium hydroxide were dissolved in 200 parts of water and allowed to absorb 66 parts of chlorine. The solution was evaporated and crystallized sodium chloride was separated by filtration as in Example I until a dry product containing 65 percent active chlorine was obtained.

*Example III*

66 parts of chlorine were absorbed by an aqueous solution containing 46 parts of lithium hydroxide after which 77 parts of sodium hydroxide were added and the mixture further treated until 67 parts of chlorine had been absorbed. The product after removal of crystallized sodium chloride and evaporation to dryness, contained 75 percent active chlorine.

Although the invention has been described with reference to the specific details of certain embodiments thereof, it is not intended that such details shall be regarded as limitations upon the scope of the invention except insofar as included in the accompanying claim.

I claim:

The process which comprises chlorinating an aqueous solution comprising lithium hydroxide and an hydroxide of the metal of the group consisting of sodium and potassium whereby an hypochlorite and a chloride are formed, precipitating a chloride of said group while retaining the hypochlorite in solution and removing the chloride precipitate from the solution.

GEORGE H. CADY.